(12) United States Patent
Xue et al.

(10) Patent No.: US 12,424,835 B2
(45) Date of Patent: Sep. 23, 2025

(54) FAULT MONITORING METHOD FOR MULTI-PORT INTERNAL PASSIVE LOAD-FREE PROBABILISTIC LOAD FLOW ELECTRIC NETWORK

(71) Applicant: BAODING YUXIN ELECTRIC TECHNOLOGY CO., LTD., Hebei (CN)

(72) Inventors: Zhanyu Xue, Hebei (CN); Jinchun Xing, Hebei (CN)

(73) Assignee: BAODING YUXIN ELECTRIC TECHNOLOGY CO., LTD., Hebei (CN)

( * ) Notice: Subject to any disclaimer, the term of this patent is extended or adjusted under 35 U.S.C. 154(b) by 158 days.

(21) Appl. No.: 18/288,688

(22) PCT Filed: Feb. 21, 2022

(86) PCT No.: PCT/CN2022/077125
§ 371 (c)(1),
(2) Date: Oct. 27, 2023

(87) PCT Pub. No.: WO2022/227817
PCT Pub. Date: Nov. 3, 2022

(65) Prior Publication Data
US 2024/0213755 A1    Jun. 27, 2024

(30) Foreign Application Priority Data

Apr. 27, 2021   (CN) .......................... 202110458549.5

(51) Int. Cl.
*H02H 1/00*   (2006.01)
*H02H 3/30*   (2006.01)
(Continued)

(52) U.S. Cl.
CPC ........ *H02H 1/0007* (2013.01); *H02H 1/0061* (2013.01); *H02H 3/30* (2013.01); *H02H 7/261* (2013.01); *H02H 3/33* (2013.01)

(58) Field of Classification Search
CPC .. H02H 1/0007; H02H 1/0061; H02H 1/0092; H02H 3/28
See application file for complete search history.

(56) References Cited

U.S. PATENT DOCUMENTS 5,905,619 A  *  5/1999  Jha ........................ H02H 1/0015
                                                    361/93.6
8,260,469 B2 *  9/2012  Gregory ............ H02J 13/00002
                                                    700/297
(Continued)

FOREIGN PATENT DOCUMENTS

CN         105356430 A       4/2017
CN         108206523 A       6/2018
(Continued)

OTHER PUBLICATIONS

PCT International Search Report dated May 5, 2022, PCT/CN2022/077125.
(Continued)

*Primary Examiner* — Giovanni Astacio-Oquendo
*Assistant Examiner* — Temilade S Rhodes-Vivour
(74) *Attorney, Agent, or Firm* — Suiter Swantz IP

(57) ABSTRACT

A fault monitoring method for a multi-port internal passive load-free probabilistic load flow (PLF) electric network is presented. Current transformers are installed on the conductors. Currents from the current transformers are transformed into voltages, and the voltages are then converted into pulses by a voltage-to-frequency conversion (VFC) circuit. The pulses are transmitted via optical fiber to a comparison module, and an algebraic sum of all pulse counts is calculated. It is stipulated that when an installation direction of
(Continued)

the current transformer is the same as a direction of the port pointing to the PLF electric network, the pulse count is positive, and when the installation direction of the current transformer is opposite to the direction of the port pointing to the PLF electric network, the pulse count is negative. When the algebraic sum exceeds a threshold, it is determined that a fault has occurred within the PLF electric network.

6 Claims, 1 Drawing Sheet

(51) Int. Cl.
  *H02H 3/33* (2006.01)
  *H02H 7/26* (2006.01)

(56) References Cited

U.S. PATENT DOCUMENTS

| | | | |
|---|---|---|---|
| 9,484,747 B1* | 11/2016 | Avritzer | G06N 7/01 |
| 2003/0105608 A1 | 6/2003 | Hart | |
| 2010/0008000 A1* | 1/2010 | Riley | H02H 7/261 361/44 |
| 2011/0035077 A1* | 2/2011 | Lee | H02J 3/1878 700/298 |
| 2017/0331274 A1* | 11/2017 | Akke | G01R 31/086 |

FOREIGN PATENT DOCUMENTS

| | | |
|---|---|---|
| CN | 111463758 A | 7/2020 |
| CN | 215599285 U | 1/2022 |
| CN | 114039326 A | 2/2022 |

OTHER PUBLICATIONS

Liang Ying, Application of Stochastic Load Flow in Security Risk Assessment of Transmission Network, Journal of North China Electric Power University, vol. 43, No. 4, Jul. 30, 2016 (Jul. 30, 2016), ISSN: 1007-2691.

\* cited by examiner

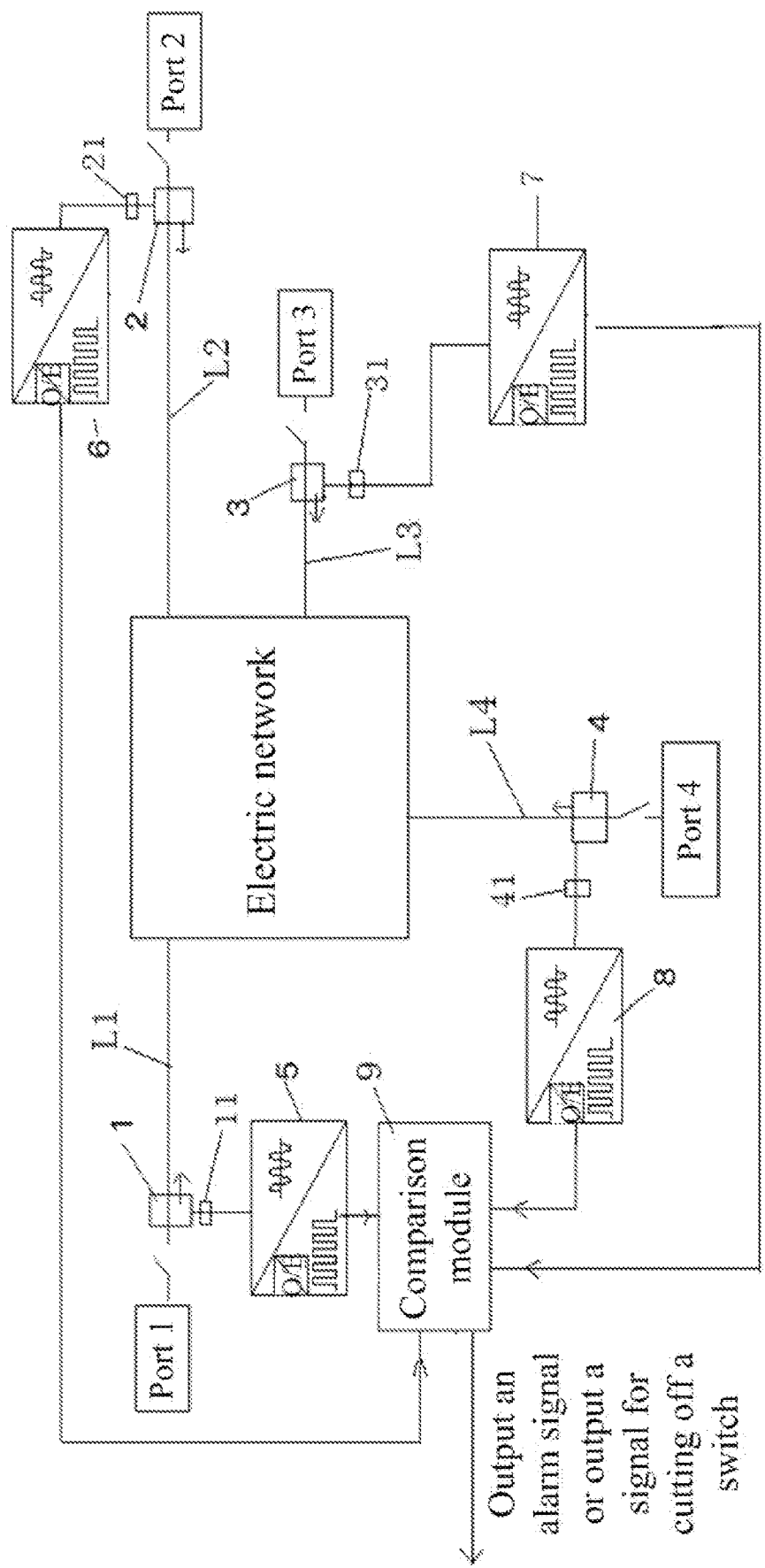

FAULT MONITORING METHOD FOR MULTI-PORT INTERNAL PASSIVE LOAD-FREE PROBABILISTIC LOAD FLOW ELECTRIC NETWORK

CROSS REFERENCE TO RELATED APPLICATION

This patent application is a national stage application of International Patent Application No. PCT/CN2022/077125, filed on Feb. 21, 2022, which claims the benefit and priority of Chinese Patent Application No. 202110458549.5, filed with the China National Intellectual Property Administration on Apr. 27, 2021, the disclosure of which is incorporated by reference herein in its entirety as part of the present application

TECHNICAL FIELD

The present disclosure relates to the field of electrical protection and monitoring, and in particular to a fault monitoring method for a multi-port internal passive load-free probabilistic load flow (PLF) electric network.

BACKGROUND

Differential protection is a method for line protection, commonly employed between a mainline and a branch line. In existing differential protection, a current transformer (CT) obtains parameters such as currents and voltages at both ends of a line, converts the parameters into messages, and sends the messages to a computer. The computer interprets these messages and compares the currents at the upstream and downstream points of the line to check whether the current at the upstream point is equal to the current at the downstream point. If the currents are not equal, it is determined that a fault has occurred, and a switch of the line is tuned off to isolate the faulted line. However, the process of message programming and creation, transmission, reception, interpretation, and more involves many steps, requiring numerous components, an extensive amount of computation, and complex algorithms, and results in a longer overall response time, making the design of a reliable device challenging. In order to improve the response time of differential protection, Patent Application No. CN111463758A has disclosed a power line protection method, which involves converting currents on input and output switches into pulses with a corresponding relation, directly transmitting the pulses point-to-point to a comparison module, and then determining a difference between the corresponding currents based on a difference between the input and output pulses, thereby making a response. The advantage of this method is that it eliminates the need for message programming and reduces component usage, which significantly improves the response speed. Compared to traditional protection methods, the response time of differential protection is reduced from 26 to 40 milliseconds to less than 5 milliseconds. However, this method is only applicable to electric networks with defined sources and loads, i.e., electric power systems where the direction of the power flow is defined. Such systems have clearly defined sources and loads, and the direction of power transmission is always from the source to the load. With the technological and social development, electric networks become increasingly complex. In a complex electric network that is internally passive and load-free and has no energy storage components therein, the direction of power flowing through each port can change at any time. Especially, for a junction substation in a complex supply network, the direction of the power flow in each incoming and outgoing line is random. Furthermore, modern households, as power consumers, not only have loads such as household appliances but also install power generation apparatuses for solar power, wind power and so on. Excess electricity can be fed back into the grid. When ports of an electric network exhibit the characteristics mentioned above, the method described in the previous patent application cannot be used to monitor whether faults have occurred within the network.

SUMMARY

Technical Problems

An objective of the present disclosure is to provide a fault monitoring method for a multi-port internal passive load-free probabilistic load flow (PLF) electric network. This method is designed for an electric network where the direction of power transmission is uncertain, and can promptly and accurately detect whether faults such as single-phase grounding and interphase short-circuiting have occurred within the electric network. The method achieves advantages such as fast fault response, and precise and timely detection.

Solutions to the Problems

Technical Solutions

To achieve the foregoing objective, the present disclosure adopts the following technical solution: a fault monitoring method for a multi-port internal passive load-free probabilistic load flow (PLF) electric network. The PLF electric network is connected to ports via conductors, with current transformers installed on the conductors. Currents from the current transformers are transformed into voltages, and the voltages are then converted into pulses by a voltage-to-frequency conversion (VFC) circuit. The pulses are transmitted via optical fiber to a comparison module. The comparison module calculates an algebraic sum of all pulse counts corresponding to the current transformers. It is stipulated that when an installation direction of the current transformer is the same as a direction of the port pointing to the PLF electric network, the pulse count is positive, and when the installation direction of the current transformer is opposite to the direction of the port pointing to the PLF electric network, the pulse count is negative. Alternatively, it is stipulated that when the installation direction of the current transformer is the same as the direction of the port pointing to the PLF electric network, the pulse count is negative, and when the installation direction of the current transformer is opposite to the direction of the port pointing to the PLF electric network, the pulse count is positive. When the algebraic sum exceeds a threshold, it is determined that a fault has occurred within the PLF electric network.

Preferably, the voltage is elevated by a reference voltage elevation circuit before being inputted into the VFC circuit.

Preferably, the installation direction of each current transformer is the same as or opposite to the direction of the port pointing to the PLF electric network. The comparison module includes a counter and an adder, and the algebraic sum is obtained by summing all the pulse counts.

Preferably, an output of the comparison module is reset every fixed period.

Preferably, a voltage at an installation position of any of the current transformers is introduced by a voltage transformer. The voltage is converted into a square wave in phase with a zero-crossing point through a waveform shaping circuit, and correction based on voltage phase synchronization is performed using a rising edge or falling edge of the square wave when an error within the fixed period exceeds a second preset value, provided that the voltage is not lower than a first preset value.

Preferably, N comparison modules are set up to calculate the algebraic sum of all the pulse counts, an output of each comparison module is reset every fixed period T, and moments at which different comparison modules start resetting the outputs are staggered by T/N. When a calculation result of at least one comparison module exceeds a threshold, it is determined that a fault has occurred within the PLF electric network, where N is a positive integer greater than 1.

Beneficial Effects of the Present Disclosure

Beneficial Effects

The present disclosure achieves the following beneficial effects: For a PLF electric network where the direction of power at each port is uncertain, a current on the conductor is converted into a voltage, and then the voltage is transformed into pulses through a voltage-to-frequency conversion (VFC) circuit. These pulses are transmitted via optical fiber to a comparison module, and an algebraic sum of all pulse counts is calculated. A relationship between the positive or negative value of the pulse count and the installation direction of the current transformer is stipulated. Regardless of whether power flows into or out of a port at a particular moment, or if the flow direction continuously changes, the positive and negative values in the algebraic sum should cancel out. Otherwise, it indicates the occurrence of a fault such as single-phase grounding or interphase short-circuiting within the PLF electric network. The present disclosure associates the use of VFC with the installation direction of the current transformer and defines the positive and negative signs for the pulse counts. This approach fully utilizes the convenience of VFC conversion that does not need protocols, effectively solving the challenge of uncertain power flow directions in PLF electric networks, which is why the method in Patent Application No. CN111463758A is not applicable to PLF electric networks. The present disclosure can accurately and rapidly determine whether faults have occurred within the PLF electric network.

BRIEF DESCRIPTION OF THE DRAWINGS

Description of Drawings

FIG. 1 is a schematic diagram of lines of the present disclosure.

Reference numerals: 1, 2, 3, and 4: current transformer; 11, 21, 31, and 41: secondary current transformer; L1, L2, L3, and L4: conductor; 5, 6, 7, and 8: VFC; 9: comparison module, O: optical, and E: electric.

DETAILED DESCRIPTION OF THE EMBODIMENTS

Embodiments of the Present Disclosure

In conjunction with the accompanying drawings, the present disclosure is further explained through specific embodiments. As shown in FIG. 1, an internally passive and load-free electric network is connected to an external power source and loads through four conductors. A current transformer 1 is disposed on a conductor L1, a current transformer 2 is disposed on a conductor L2, a current transformer 3 is disposed on a conductor L3, and a current transformer 4 is disposed on a conductor L4. The other end of each of the four conductors can be a power source end or a load end, which changes randomly. In other words, a power transmission direction on each conductor can either be towards the port or towards the electric network from the port, and the direction can change at any time, thereby forming what is known as a PLF electric network. The current transformer 1 on the conductor L1 is used to detect a current flowing through the conductor L1, and an installation direction of the current transformer 1 is aligned with a direction from the port or the conductor L1 towards the electric network. A current of the primary current transformer 1 on the conductor L1 is converted into a voltage by a secondary current transformer 11. The voltage is then transmitted to a VFC circuit 5 and is converted into pulses through VFC, where a pulse count is proportional to the voltage. These pulses are then transmitted through optical fiber to a comparison module 9. Similarly, the current transformer 2 on the conductor L2 is used to detect a current flowing through the conductor L2, and an installation direction of the current transformer 2 is aligned with a direction from the conductor L2 towards the electric network. The current on the conductor L2 is converted into a voltage by a secondary current transformer 21 and is then transformed into pulses by a VFC circuit 6. These pulses are transmitted through optical fiber to the comparison module 9. The current transformer 3 on the conductor L3 is used to detect a current flowing through the conductor L3, and an installation direction of the current transformer 3 is aligned with a direction from the conductor L3 towards the electric network. The current on the conductor L3 is converted into a voltage by a secondary current transformer 31 and is then transformed into pulses by a VFC circuit 7. These pulses are transmitted to the comparison module 9. The current transformer 4 on the conductor L4 is used to detect a current flowing through the conductor L4, and an installation direction of the current transformer 4 is aligned with a direction from the conductor L4 towards the electric network. The current on the conductor L4 is converted into a voltage, which is then converted into pulses by a VFC circuit 8. These pulses are transmitted to the comparison module 9. An algebraic sum of the pulses from the four sources is calculated in the comparison module 9. The installation directions of the four current transformers are consistent, with each pointing from the port towards the electric network. Corresponding pulse counts can be set as positive (i.e., pulse counts corresponding to power flowing into and out of the electric network are set as positive). In this way, the summation is directly performed in the comparison module 9. When the sum exceeds a threshold, it is determined that a fault has occurred within the electric network, such as a single-phase grounding fault or an interphase short-circuit fault. At this point, the comparison module can send an alarm signal or send an instruction to cut off a switch at the power source for protection. In the above embodiment, the installation directions of the current transformers (i.e., forward directions in which the current transformers are wound on the conductors during installation, where each current transformer has a mark indicating the installation direction of power in/out direction, and the installation direction is indicated by the arrow on the current transformer in FIG. 1)

are all from the port towards the electric network. In another embodiment, if the installation directions of the current transformers are randomly selected, it can be stipulated that the installation direction from the port towards the electric network corresponds to a positive (or negative) pulse count, and the installation direction from the electric network towards the port corresponds to a negative (or positive) pulse count. Following this rule, the comparison module calculates the algebraic sum of the pulse counts.

In a specific embodiment, all the current transformers have the same installation direction, and the comparison module 9 includes a counter and an adder. The comparison module 9 first converts the pulses into digital values representing the pulse counts, sums these digital values using the adder, and compares the sum with a threshold. If the sum exceeds the threshold, it can be determined that a fault has occurred within the network.

Considering noise errors in VFC conversion and during the calculation in the comparison module, as well as the cumulative effect of errors, it is necessary to periodically reset the output of the comparison module to zero to prevent cumulative errors from exceeding a preset threshold and affecting the judgment. For example, in one embodiment, a fixed-period circuit with a period of 10 milliseconds is constructed first. A voltage of the circuit at the installation position of any of the current transformers is introduced through a voltage transformer. When the voltage value is not lower than a preset value, the voltage is transformed into a square wave in phase with a zero-crossing point through a waveform shaping circuit. A rising edge or falling edge of the square wave in phase with the zero-crossing point is sampled every two voltage cycles, to perform synchronization correction on the 10-millisecond fixed-period circuit, such that the 10-millisecond period is kept synchronous with the voltage cycle of the circuit. Alternatively, the correction may be omitted, and the fixed-period circuit resets the output of the comparison module every 10 milliseconds, ensuring that the cumulative noise errors do not exceed the threshold and lead to misjudgments. However, faults occur randomly. If a fault occurs within 0 to 5 milliseconds after the reset, and it is assumed that the calculation result of the comparison module exceeds the preset threshold after 5-millisecond accumulation, then it would take 5 to 10 milliseconds from the reset to detect the fault and cut off the switch. However, if a fault occurs within 5 to 10 milliseconds after the reset, it would still take more than 10 milliseconds from the reset to accumulate a result exceeding the threshold because it requires 5 milliseconds of accumulation, while at the 10 milliseconds after the reset, another reset occurs. In this case, the calculation result of the comparison module needs to be recalculated and accumulated again after being reset. Only after another 5 milliseconds will it accumulate to reach the threshold. As a result, the time between the fault occurrence and the next reset does not contribute to accumulation, resulting in a waste of time and delay in tripping the switch. Therefore, the maximum delay for cutting off the switch can be up to 5 milliseconds, thus delaying fault detection and cut-off action.

To overcome this situation, a plurality of comparison modules can be arranged. For example, two comparison modules can be arranged, where the pulses corresponding to the currents of each switch are inputted into both the first comparison module and the second comparison module simultaneously. Both comparison modules run in parallel, converting the pulse counts into digital values and performing addition or subtraction calculations. The comparison modules are reset using two delay circuits triggered by the rising edge or falling edge of the square wave. The first delay circuit resets the first comparison module, and the second delay circuit resets the second comparison module. Both have a reset cycle of 10 milliseconds, but the reset of the second comparison module starts 5 milliseconds (10/2=5) after the reset of the first comparison module, which means resetting the second comparison module 5 milliseconds after the resetting the first comparison module. A logical "OR" operation is performed on the results of the two comparison modules, that is, if at least one of the calculation results exceeds the threshold, the switch will be cut off. In the case mentioned above (where a fault occurs within 5 to 10 milliseconds after the reset), for the first comparison module, the fault is still not accumulated to exceed the threshold by the next reset, and it would need another 5 milliseconds of accumulation after the reset, which is the same as the previous mentioned above. However, for the second comparison module, its reset operation begins 5 milliseconds after the reset of the first comparison module. Therefore, for the second comparison module, the fault occurs within 0 to 5 milliseconds after the reset, and the accumulation would reach the threshold within 5 to 10 milliseconds from the reset (i.e., before another reset of the second comparison module), avoiding any waste of time. When the calculation result of the second comparison module exceeds the threshold, even though the first comparison module has not reached the threshold due to re-calculation, an alarm would still be triggered, indicating a fault within the electric network. This allows for an appropriate switch to be tripped for protection.

If the time required for accumulation to reach the threshold after fault occurrence is not 5 milliseconds but 3.333 milliseconds, assuming that the reset cycle remains at 10 milliseconds, then three comparison modules can be set up, with reset moments staggered by 10/3=3.333 milliseconds to avoid a similar issue. The approach of using a plurality of comparison modules to perform parallel calculations and staggering the reset moments is different from the approach of using a single comparison module and simply shortening the reset cycle, because keeping the reset cycle unchanged ensures tolerance to noise errors, guaranteeing operational reliability, while staggered resetting enhances the timeliness of actions.

In one embodiment, if the VFC circuit can only accept positive voltages, weak AC voltage signals transformed from primary AC currents are obtained by a primary current transformer and a secondary current transformer at each port. These signals are first elevated using a DC reference voltage raising circuit, converting the weak AC voltages into positive-value pulsating DC voltages, which are then inputted into the VFC circuit (the VFC circuit generally only supports positive polarity input). However, during calculations, the pulse counts within one reset cycle caused by various reference voltage elevation circuits need to be deducted accordingly.

In another embodiment, a voltage at the installation position of any current transformer can be introduced by a voltage transformer. The voltage is transformed into a square wave in phase with the zero-crossing point through a waveform shaping circuit. When the voltage is not lower than a first preset value (indicating no faults in the line, as there is a certain voltage; the preset value is set artificially according to the actual situation), a rising edge or falling edge of the square wave is used for correction based on voltage phase synchronization if an error in the fixed reset cycle exceeds a second preset value (the second preset value is set artificially, and correction is performed when the error exceeds this value).

The above embodiments are merely some illustrations of the concept and implementation of the present disclosure, not limitations. Under the concept of the present disclosure, technical solutions that are not substantially changed still fall within the scope of protection.

INDUSTRIAL APPLICABILITY

Experiments for fault monitoring in a multi-port internal passive load-free probabilistic load flow (PLF) electric network have been conducted. The experimental results demonstrate the feasibility of the method of the present disclosure.

What is claimed is:

1. A fault monitoring method for a multi-port internal passive load-free probabilistic load flow (PLF) electric network, comprising:

connecting the PLF electric network to ports via conductors, with current transformers installed on the conductors;

transforming currents from the current transformers into voltages, and then converting the voltages into pulses by a voltage-to-frequency conversion (VFC) circuit;

transmitting the pulses via optical fiber to a comparison module;

calculating an algebraic sum of all pulse counts corresponding to the current transformers by the comparison module, wherein it is stipulated that when an installation direction of the current transformer is the same as a direction of the port pointing to the PLF electric network, the pulse count is positive, and when the installation direction of the current transformer is opposite to the direction of the port pointing to the PLF electric network, the pulse count is negative; or it is stipulated that when the installation direction of the current transformer is the same as the direction of the port pointing to the PLF electric network, the pulse count is negative, and when the installation direction of the current transformer is opposite to the direction of the port pointing to the PLF electric network, the pulse count is positive; and determining, by the comparison module, that a fault has occurred within the PLF electric network when the algebraic sum exceeds a threshold.

2. The fault monitoring method according to claim 1, further comprising:

elevating the voltage by a reference voltage elevation circuit before being inputted into the VFC circuit.

3. The fault monitoring method according to claim 1, wherein the installation direction of each current transformer is same as or opposite to the direction of the port pointing to the PLF electric network, the comparison module comprises a counter and an adder, and the algebraic sum is obtained by summing all the pulse counts.

4. The fault monitoring method according to claim 3, further comprising:

resetting an output of the comparison module every fixed period.

5. The fault monitoring method according to claim 4, further comprising:

introducing a voltage at an installation position of any of the current transformers by a voltage transformer;

converting the voltage into a square wave in phase with a zero-crossing point through a waveform shaping circuit; and performing correction based on voltage phase synchronization is performed using a rising edge or falling edge of the square wave if an error within the fixed period exceeds a second preset value when the voltage is not lower than a first preset value when the voltage is not lower than a first preset value.

6. The fault monitoring method according to claim 4, wherein N comparison modules are set up to calculate the algebraic sum of all the pulse counts, an output of each comparison module is reset every fixed period T, and moments at which different comparison modules start resetting the outputs are staggered by T/N; and when a calculation result of at least one comparison module exceeds a threshold, it is determined that a fault has occurred within the PLF electric network, wherein N is a positive integer greater than 1.

* * * * *